Patented Sept. 29, 1953

2,653,969

UNITED STATES PATENT OFFICE 2,653,969

PROCESS OF PREPARING TERTIARY ACRYLIC ACID ESTERS FROM ACETYLENE

Otto Albrecht, Muenchenstein, and Arthur Maeder, Basel, Switzerland, assignors to Ciba Limited, Basel, Switzerland, a Swiss firm No Drawing. Application June 19, 1950, Serial No. 169,072. In Switzerland February 21, 1947

7 Claims. (Cl. 260—486)

This application is a division of application Ser. No. 7998, filed February 12, 1948, now abandoned.

According to this invention esters of olefine carboxylic acids are made by treating a compound of the acetylene series with nickel carbonyl or cobalt carbonyl with the addition of an acid and of a hydroxy compound which contains at least one hydroxy group bound to an aliphatic carbon atom, the three remaining valences of which are bound to carbon. In this manner there are obtained from compounds containing the grouping —C≡C—, esters containing the grouping

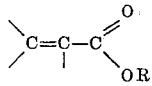

in which —OR represents the residue of the hydroxy compound used having the formula HOR, or mixtures of such an ester with the free olefine carboxylic acid. With acetylene there are obtained by this process esters of acrylic acid or mixtures of acrylic acid esters and free acrylic acid.

As a compound of the acetylene series acetylene itself is the preferred starting material. However, there may also be used as starting materials substituted acetylenes such as methyl-acetylene, ethyl-acetylene, phenyl-acetylene, vinyl-acetylene, divinyl-acetylene, isopropenyl-acetylene, 1-ethinyl-cyclohexene-(1); and also alkinols or alkine-diols such as butine-(1)-ol-(4), pentene-(3)-ine-(1)-ol-(5), and also ethers or esters thereof or products obtainable therefrom by dehydration; furthermore ketones of the acetylene series, such as hexene-(3)-ine-(5)-one-(2); also propiolic acid esters or other acetylene carboxylic acid esters, such as stearolic acid esters, dehydro-undecylenic acid esters, undecolic acid esters, behenolic acid esters. There are also to be mentioned among acetylene compounds which may be used as starting materials alkinols derived from steroid ketones, such as testosterone, or from tetralones, by the addition of acetylene.

As hydroxy compounds which contain at least one hydroxy group bound to an aliphatic carbon atom, the three remaining valences of which are bound to carbon, to be used as starting materials in the invention there may be designated tertiary aliphatic alcohols containing at least one hydroxy group, such as tertiary butyl alcohol and carbonyl compounds which are capable of reacting in the enol form, such as acetoacetic acid esters, α-mono-substituted acetoacetic acid esters; acetyl-acetone, oxalacetone or oxalacetic acid esters.

There may be used as acids in the present invention, for example, hydrohalic acids, especially hydrochloric acid, but also phosphoric acid or acetic acid. They are advantageously used in aqueous solution.

The reaction of the invention may be carried out by mixing the reactants together at room temperature or at a raised temperature, if desired, in a pressure vessel. When acetylene and nickel carbonyl are used as starting materials the reaction may be carried out at room temperature or a moderately raised temperature, for example, at 30—80° C. under atmospheric pressure or under superatmospheric pressure. For example, acetylene may be introduced into a mixture of the hydroxy compound and the acid and the nickel carbonyl introduced dropwise at the same time. It is still more advantageous to mix the hydroxy compound, acid and nickel carbonyl together, if desired, with the addition of a solvent, preferably an inert one, and to agitate the mixture with acetylene in a suitable agitating apparatus under slightly superatmospheric pressure. Substituted acetylenes of lower reactivity, for example, alkinols, are advantageously reacted with the metal carbonyl, especially nickel carbonyl, at a raised temperature, for example, at 50–120° C., the use of the easily volatile nickel carbonyl making it necessary to work in a pressure vessel.

For the purpose of working under atmospheric pressure there are used for 1 mol of the acetylene compound at least ¼ mol of nickel carbonyl or cobalt carbonyl; at least ½ mol of a monobasic acid and at least 1 mol of the hydroxy compound. When the reaction is conducted in a pressure vessel at a raised temperature, for example, at 120–150° C., the quantity of the metal carbonyl may be reduced, but carbon monoxide must be present in excess. It is also possible to form the metal carbonyl during the reaction, when the latter is conducted at a raised temperature and under pressure, by working in the presence of metallic nickel or cobalt or a salt thereof, especially a halide, with the addition of an excess of carbon monoxide. In this case only small quantities of nickel or cobalt or a salt thereof are necessary, as these additions act as catalysts.

The process may be conducted discontinuously or continuously.

As already stated the products of the invention consist predominantly of esters of carboxylic acids which contain a double bond in the α:β-position, if desired, in admixture with the carboxylic acids from which the esters are derived. When necessary, the free olefine carboxylic acids present in the reaction mixture may be subsequently esterified. This may be brought about in the usual manner, for example, by distilling off the water present in the reaction mixture, and heating the mixture containing the olefine carboxylic acid and the alcohol until the esterification ceases. The water may be removed during the esterification azeotropically or, in the case of high boiling alcohols, by evacuation.

Owing to the reactive double bond the products of the invention are suitable, for example, as intermediate products, for instance, for the manufacture of polymerisates. The acrylic acid esters obtainable, for example, from acetylene, polymerise with the application of heat, especially in the presence of a polymerisation accelerator, such as benzoyl peroxide, whereby polymerisates are obtained whose properties depend on the choice of the starting materials.

Such polymeric acrylic acid esters can be used for producing coatings on textiles or paper, and also as artificial substances or adhesives or as constituents of lacquers, artificial masses or the like.

The following examples illustrate the invention, the parts being by weight unless otherwise stated, and the relationship of parts by weight to parts by volume being the same as that of the kilogram to the liter:

Example 1

(a) A solution of 34.7 parts of tertiary butanol (1 mol) in 90 parts of benzene heated at 60° C. is agitated with acetylene under a slightly superatmospheric pressure after being mixed with 36 parts of hydrochloric acid (density=1.199) and 20 parts of nickel carbonyl (1 mol) until gas is no longer absorbed. The reaction product is then filtered and the filtrate is fractionated by means of a column under atmospheric pressure. The ester of the formula

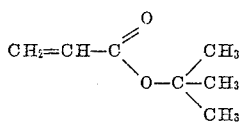

distils at 125-126° C. in the form of a colorless rather volatile liquid having a pungent tear-producing odor. By heating it with a small quantity of benzoyl peroxide (for example 1 per cent.) at 100° C. it is converted into a hard, colorless, translucent polymerisate in a short time.

(b) 30 parts of nickel carbonyl are introduced dropwise in the course of one hour into a solution of 100 parts of tertiary butanol, 29.3 parts of glacial acetic acid and 0.5 part of hydroquinone at a temperature of 40-45° C. and under an absolute pressure of 1⅕ atmospheres of acetylene while stirring.

After a further hour and when about 20 parts by volume of acetylene have been absorbed the reaction is finished.

The reaction mixture is mixed with a further 0.5 part of hydroquinone and subjected to distillation with steam. The upper ester layer is separated from the distillate, agitated in succession once with a normal solution of sodium bicarbonate and then four times with 100 parts of water on each occasion, whereby acid constituents and the excess of tertiary butanol are removed. After drying with sodium sulfate in cool surroundings there are obtained 51.5 parts of crude ester in the form of a clear slightly yellow liquid. By fractional distillation under reduced pressure there are obtained therefrom 40 parts of the pure water-clear tertiary butyl-acrylate, boiling at 51–52.5° C. under 64–70 mm. pressure.

(c) 30 parts of nickel carbonyl are introduced dropwise into a mixture of 100 parts of tertiary butanol, 30 parts of phosphoric acid of 70 per cent. strength and 0.5 part of hydroquinone in a manner analogous to that described under (a) above. In this case the nickel carbonyl is introduced in the course of 1½ hours. After a total of 6 hours the reaction is finished and by this time about 19 parts by volume of acetylene will have been absorbed.

After the addition of a further 0.5 part of hydroquinone, the crude ester is removed from the reaction mixture by distillation with steam, the water is separated and the ester agitated 3 times with 50 parts of a 1 N-solution of sodium bicarbonate and twice with 100 parts of water on each ocasion. After drying with sodium sulfate in cool surroundings, there are obtained 40 parts of crude ester in the form of an almost colorless liquid.

The crude product is fractionally distilled under reduced pressure to yield 30.5 parts of pure tertiary butyl acrylate. Instead of tertiary butanol another tertiary alcohol, for instance, tertiary lauryl alcohol or α-terpineol may be used.

Example 2

A solution, heated at 50–60° C. of 30.5 parts of acetoacetic acid ethyl ester (1 mol) and 90 parts of benzene is agitated with acetylene under a slightly superatmospheric pressure, after the addition of 18 parts of concentrated hydrochloric acid (density=1.199) and 10 parts of nickel carbonyl, until the gas is no longer absorbed. The reaction proceeds somewhat more slowly than in the case of primary alcohols. The reaction product is filtered and the solvent is removed by distillation. The oily residue can be purified by distillation under reduced pressure.

By heating the crude ester with a small quantity of benzoyl peroxide (for example about 2 per cent.) on the water bath there is obtained after 2–3 hours a viscous resinous polymerisate.

Having thus described the invention, what is claimed is:

1. A process for the manufacture of an acrylic acid ester which comprises treating acetylene with nickel carbonyl with the addition of an acid and of a hydroxy compound which contains at least one hydroxy group bound to an aliphatic carbon atom, the three remaining valences of which are bound to carbon.

2. A process for the manufacture of an acrylic acid ester which comprises treating acetylene with nickel carbonyl with the addition of an acid and of a tertiary aliphatic alcohol.

3. A process for the manufacture of an acrylic acid ester which comprises treating acetylene with nickel carbonyl with the addition of an acid and of tertiary butyl alcohol.

4. A process for the manufacture of an acrylic acid ester which comprises treating acetylene with nickel carbonyl with the addition of anhydrous acetic acid and tertiary butyl alcohol at a temperature of 40–50° C. and under an acetylene pressure which exceeds one atmosphere.

5. A process for the manufacture of an acrylic acid ester which comprises treating acetylene with nickel carbonyl with the addition of an acid and of a hydroxy compound which contains at least one enolic hydroxy group.

6. A process for the manufacture of an acrylic acid ester which comprises treating acetylene with nickel carbonyl with the addition of an acid and of acetoacetic acid ethyl ester.

7. The ester of acrylic acid with acetoacetic acid ethyl ester.

OTTO ALBRECHT.
ARTHUR MAEDER.

References Cited in the file of this patent

UNITED STATES PATENTS

| Number | Name | Date |
|---|---|---|
| 2,117,349 | Neher | May 17, 1938 |
| 2,466,738 | Phillips | Apr. 12, 1949 |

OTHER REFERENCES

Modern Plastics, vol. 23, pp. 162, 163 and 210 (Nov. 1945).

Reppe, "Advances in Acetylene Chemistry," (Intelligence Division Report No. 4149. Published by OTS as PB-1112, Jan. 25, 1946), pp. 21-23.